(No Model.) 6 Sheets—Sheet 1.

C. FAURE.
APPARATUS FOR ROLLING UP STRIPS OR WEBS.

No. 479,875. Patented Aug. 2, 1892.

Witnesses
Chas. H. Smith
J. Staib

Inventor
Charles Faure
per Lemuel W. Serrell Atty.

(No Model.) 6 Sheets—Sheet 2.
C. FAURE.
APPARATUS FOR ROLLING UP STRIPS OR WEBS.
No. 479,875. Patented Aug. 2, 1892.
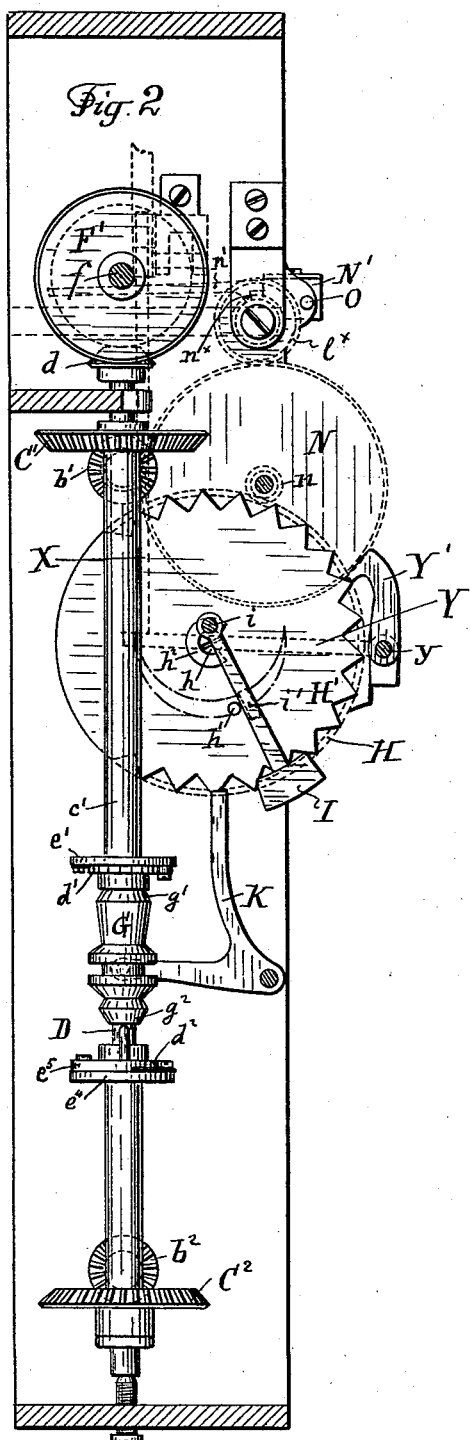
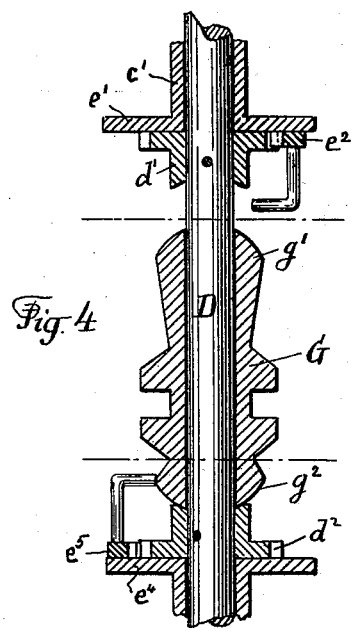
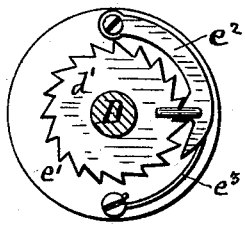
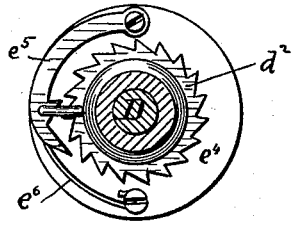
Witnesses
Chas H Smith
J. Staib
Inventor
Charles Faure
per Lemuel W. Serrell
Atty (No Model.) 6 Sheets—Sheet 3.

C. FAURE.
APPARATUS FOR ROLLING UP STRIPS OR WEBS.

No. 479,875. Patented Aug. 2, 1892.

(No Model.) 6 Sheets—Sheet 4.
C. FAURE.
APPARATUS FOR ROLLING UP STRIPS OR WEBS.

No. 479,875. Patented Aug. 2, 1892.

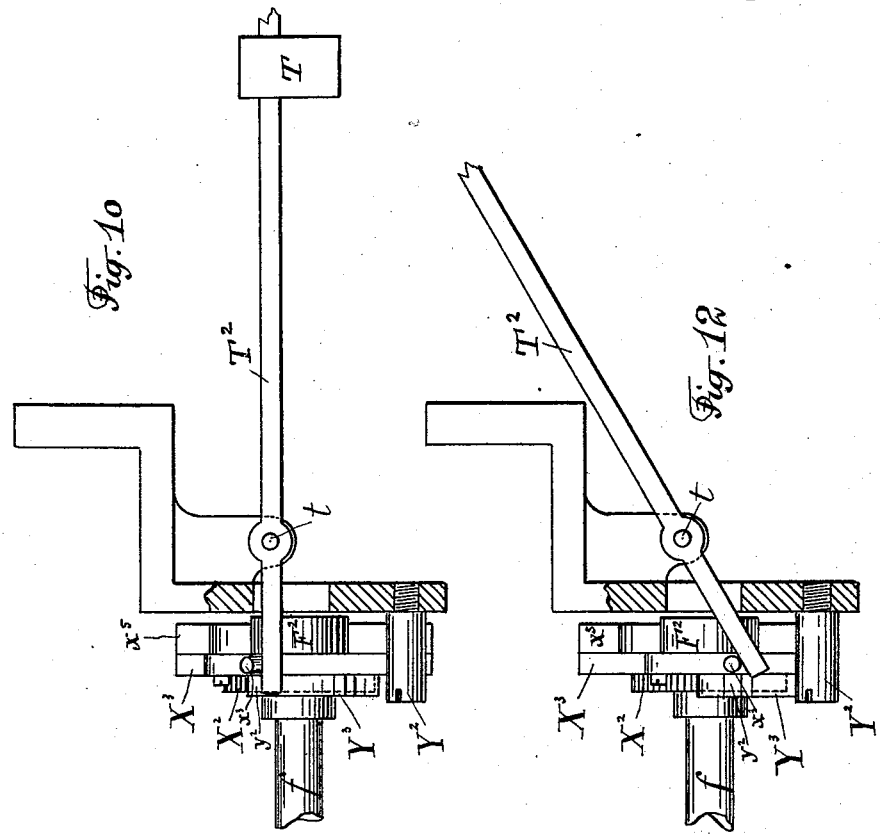

(No Model.) 6 Sheets—Sheet 6.

C. FAURE.
APPARATUS FOR ROLLING UP STRIPS OR WEBS.

No. 479,875. Patented Aug. 2, 1892.

Witnesses
Chas. H. Smith
Harold Serrell

Inventor
Charles Faure
per Lemuel W. Serrell
Atty

UNITED STATES PATENT OFFICE.

CHARLES FAURE, OF NEUFCHÂTEL, SWITZERLAND.

APPARATUS FOR ROLLING UP STRIPS OR WEBS.

SPECIFICATION forming part of Letters Patent No. 479,875, dated August 2, 1892.

Application filed February 12, 1892. Serial No. 421,258. (No model.)

*To all whom it may concern:*

Be it known that I, CHARLES FAURE, mechanician, of Neufchâtel, Switzerland, have invented an Improvement in Apparatus for Rolling Up Strips or Webs, of which the following is a specification.

This apparatus is especially intended for the display of advertisements, pictures, &c., and the strip of fabric, such as canvas, paper, ribbon, or other material, with the designs, pictures, or advertisements that are to be displayed upon the face of it, is connected to two rollers or cylinders, and the mechanism is arranged with reference to rolling the web upon one cylinder as it is unrolled from the other cylinder, and the movement is arrested when the device that is to be displayed comes into position, and it remains for a predetermined interval of time and then the movement is continued in one direction, and when the web has been unrolled from one cylinder the direction of movement is reversed, so that the web is rolled upon the other cylinder.

Figure 1:
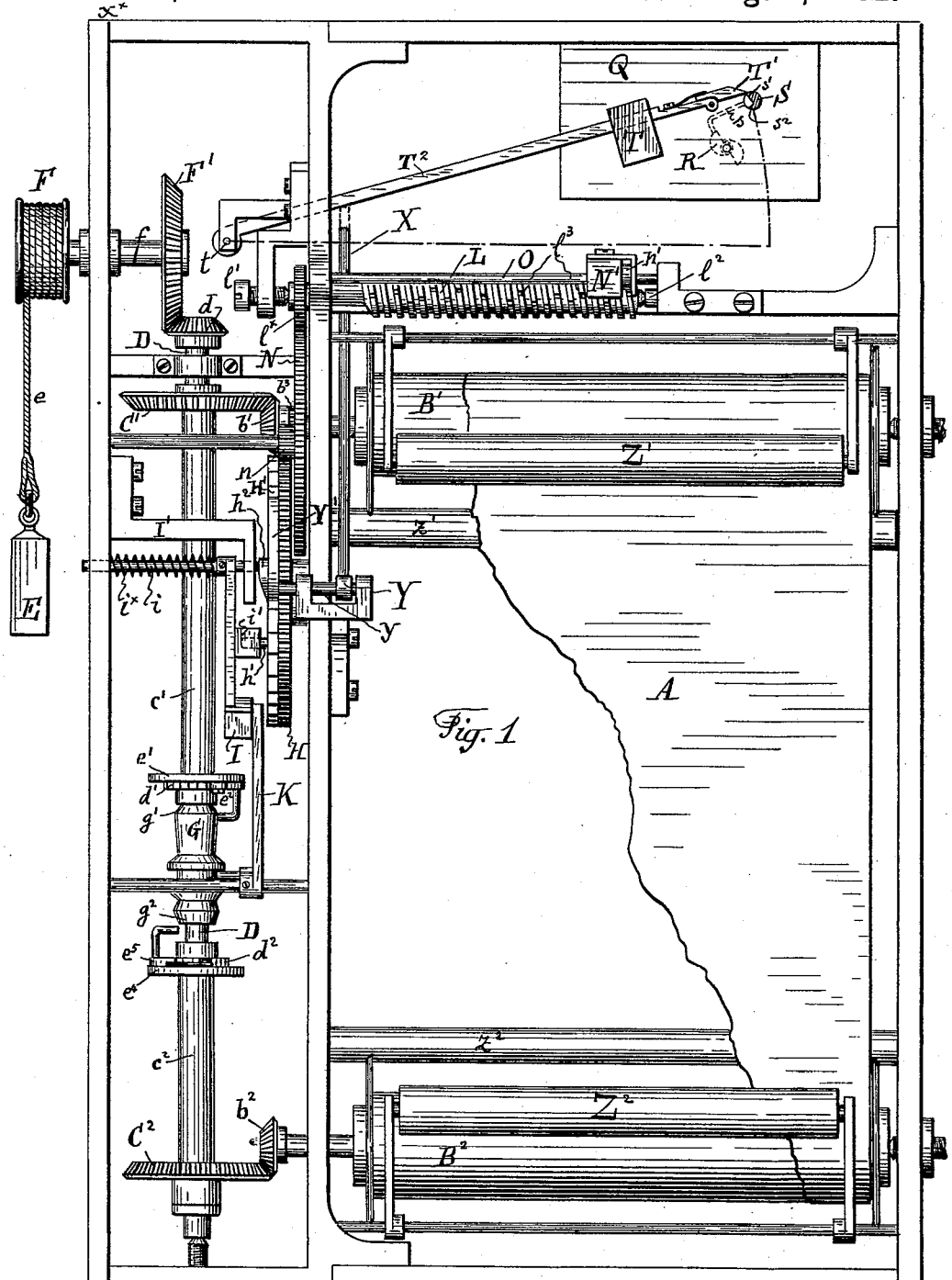
Figure 3:
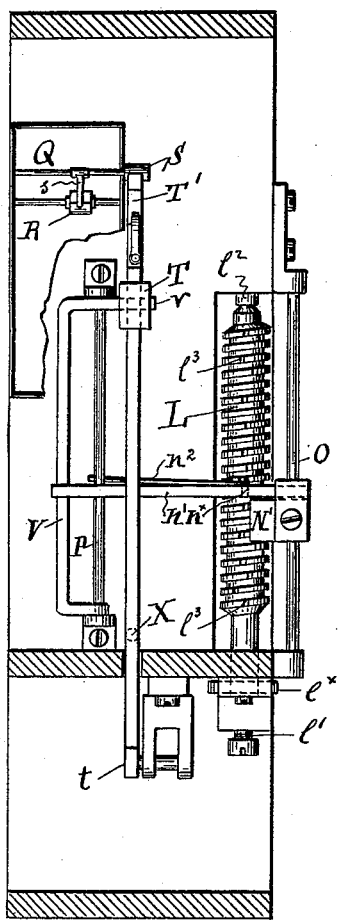
Figure 7:
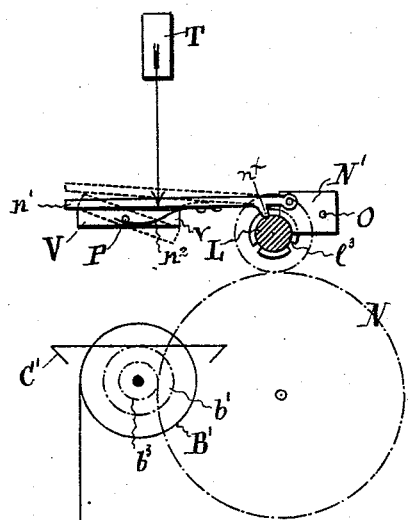
Figure 8:
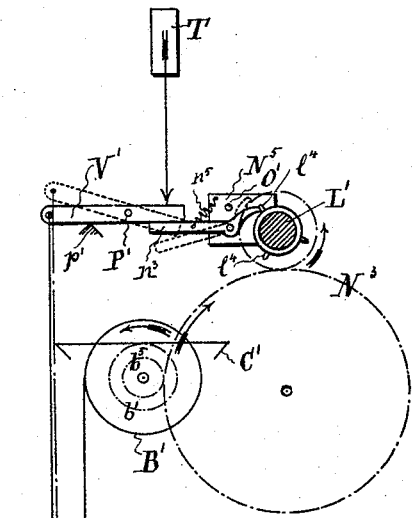
Figure 13:
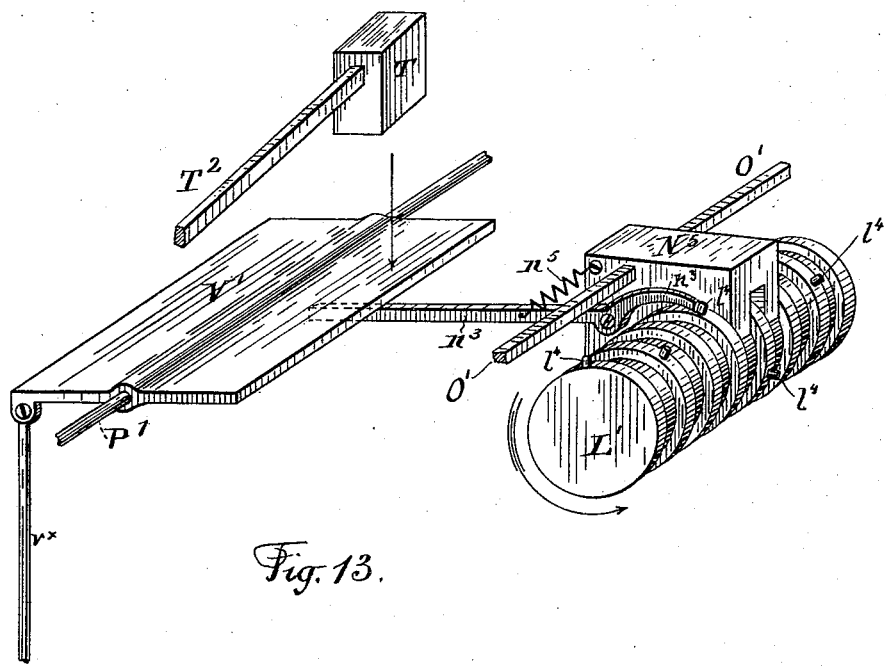
Figure 14:
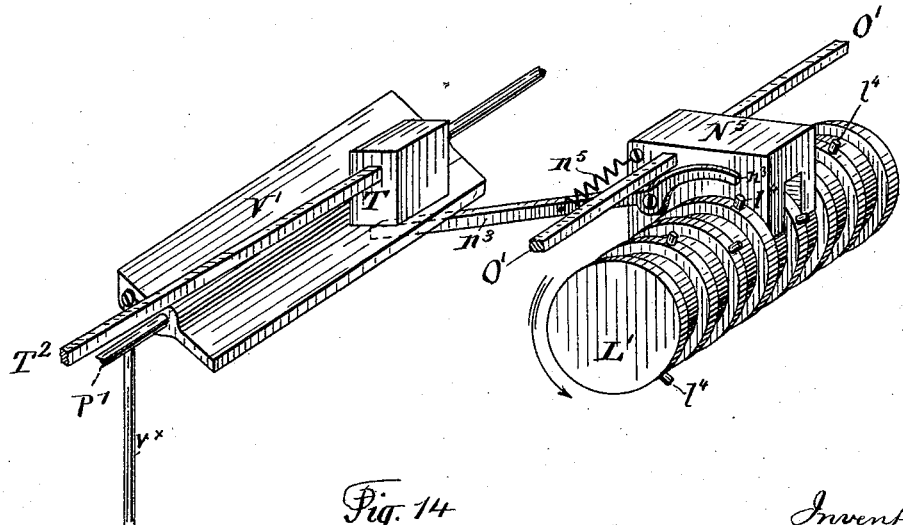

In the accompanying drawings, Figure 1 is a front elevation with the case of the apparatus open. Fig. 2 is a side elevation, partially in section, at the line X $x$ Y $x$ of Fig. 1 and without the casing. Fig. 3 is a plan of the screw mechanism, the case being in section. Figs. 4, 5, and 6 represent details of the clutch mechanism on an enlarged scale. Fig. 7 is a diagram representing the web and the device for stopping the screw. Fig. 8 is a similar view illustrating modifications. Fig. 9 is an end view, and Fig. 10 a side view, illustrating a modification in the hammer-lifting mechanism; and Fig. 11 is an end view, and Fig. 12 a side view, of the same part in different positions. Fig. 13 is a perspective view, on an enlarged scale, representing the screw-stopping mechanism in one position; and Fig. 14 is a similar view representing the same parts in another position.

The canvas, cloth, or other material A is connected at one end to a roller B' and at the other end to a roller B², and these rollers are rotated, as hereinafter described, to wind the canvas or cloth from one roller onto the other and move such canvas first in one direction and then in the other, and the canvas or web is to be guided in any suitable way. I have represented the guide-rolls $z'$ $z^2$ as upon one side of the web and the tension-rolls Z' Z² as upon the other side of the web.

I make use of any suitable device—such as a weight E, with a cord $e$ around a drum F—as the means for rotating the web or canvas, and this drum F is upon the shaft $f$, with a bevel-gear F', that rotates the bevel-pinion $d$ and its driving-shaft D, and upon this shaft D are two tubular sleeves $c'$ $c^2$, which are loose upon the driving-shaft D, and they are coupled thereto, so that one is rotated by being connected with the shaft and the other is loose upon the shaft, and upon the tubular sleeve $c'$ is a bevel-wheel C', gearing to the bevel-pinion $b'$ upon the axis of the roller B', and upon the tubular sleeve $c^2$ is a bevel-gear C², driving the bevel-pinion $b^2$ upon the axis of the roller B². Hence when the sleeve $c^2$ is coupled to the driving-shaft D the roller B² is rotated to wind the canvas A upon the same, and when the tubular sleeve $c'$ is coupled to the driving-shaft D the roller B' is rotated to wind the canvas A upon the same, the opposite roller in both cases being free to turn as the canvas is drawn off the same. Upon the lower end of the tubular sleeve $c'$ is a disk $e'$, carrying a pawl $e^2$, provided with a spring $e^3$, that presses the pawl into contact with the teeth of the ratchet-wheel $d'$, that is permanently attached to the driving-shaft D, and upon the upper end of the tubular sleeve $c^2$ is a disk $e^4$, carrying a pawl $e^5$ and spring $e^6$, and the end of the pawl engages the teeth of the ratchet-wheel $d^2$, that is permanently fastened to the driving-shaft D, and between these ratchet-wheels is a sliding coupling-box G, having conical ends, and this coupling-box is actuated by a bent lever K and the mechanism hereinafter described, and upon the respective pawls $e^2$ and $e^5$ there are fingers standing toward the sliding coupling G, so that when the said coupling G is moved downwardly the pawl $e^5$ is disengaged from the ratchet-wheel $d^2$ and the pawl $e^2$ engages the ratchet-wheel $d'$, and in this position the upper roller B' is rotated to wind the canvas A upwardly, and when the coupling-box G is raised the pawl $e^2$ is disengaged from the ratchet-wheel $d'$ and the spring-pawl $e^5$ engages the ratchet-wheel $d^2$ and the driving-shaft D rotates the winding-roller B² to draw the canvas downwardly.

Upon the arbor of the roll B' is a pinion $b^3$, gearing into a wheel N, and this wheel N has a pinion $n$, gearing into the wheel H to rotate the same, and the wheel N also gears into the pinion $l^\times$ to rotate the same and the screw L, and it will be observed that all these wheels and pinions rotate first in one direction and then in the other, according to whether the canvas is being drawn up or drawn down.

Adjacent to the wheel H and rotating with it is a ratchet-wheel H', with teeth beveled in each direction, for an object hereinafter stated, and upon the wheel H' is a projecting stud $h'$ and a cam or circular incline $h^2$, which incline surrounds the axis $h$ of the wheels H and H', and eccentric to the wheels H and H' and opposite to the cam $h^2$ is an axis $i$, supported at one end by the bracket I', and upon the axis $i$ is a pendulum hammer I, having a projection $i'$ at the side toward the pin $h'$, and there is a spring $i^\times$ around the axis $i$, tending to press the end of said axis toward the cam $h^2$.

Upon reference to Fig. 2, it will be observed that the pin $h'$ describes an arc of a circle (indicated by a dotted line) and the projection $i'$ describes a different arc of a circle in consequence of the eccentricity of the axis $i$ to the axis $h$. Hence when the wheels H and H' are going in either one direction or the other the pin $h'$ will act upon the projection $i'$ and move the pendulum hammer I, and after raising the hammer the pin $h'$ will separate from the projection $i'$ in consequence of the eccentric movement aforesaid and the hammer I will fall and strike the lever K and move the same either in one direction or the other to shift the coupling G, and as the direction of rotation is reversed, as aforesaid, the cam $h^2$ will give an end movement to the axis $i$ to move that axis and carry the hammer I laterally and out of the way of the lever K, so as to be able to lift such hammer I at the opposite side of such lever K, and the low portion of the cam $h^2$ comes opposite to the end of the axis $i$ before the pin $h'$ separates from the projection $i'$ to allow the hammer to fall, so that when the hammer falls it is in the same plane as the lever K and strikes against the same to shift the coupling G and reverse the direction of rotation of the canvas.

If the devices before described only were made use of, the canvas or web would continue to be rotated until wound from one roller onto the other and then the direction of rotation would be reversed. I have, however, provided for arresting the movement of the canvas and retaining the same in a quiescent position for the desired period of time, after which the canvas is again started, the object being to expose the advertisement, picture, or other device to view in a quiescent position for a definite period and then to start the rotation of the parts again. This is accomplished as next described.

I make use of a hammer T, and this is raised by suitable mechanism hereinafter described, and it is held up by an escapement S under the control of a clockwork within a case Q. This clockwork is of any desired character, and it causes the cams R to rotate, and there is an arm $s$ extending out from the axis of the escapement S and resting upon the cam R, and it is advantageous to employ two teeth $s'$ $s^2$ upon the escapement and a hinged latch T' at the end of the lever $T^2$, carrying the hammer T, so that when the lever $T^2$ is raised, as hereinafter described, the latch T' passes the escapement and catches over it, and when the arm $s$ of the escapement is raised by the cam R the tooth $s'$ passes from beneath the end of the latch T' and allows the latch to drop upon the tooth $s^2$, and as the end of the arm $s$ drops from the highest end of the cam R the tooth $s^2$ of the escapement clears the end of the latch T' and the hammer T falls to effect the starting of the canvas or web A, as hereinafter specified.

The gear-wheel N, rotated as before described, gives motion to the pinion $l^\times$ upon the arbor of the screw L, and this screw L acts upon a traveling nut N', Figs. 1, 2, and 7, and on this nut N' is pivoted a lever $n'$, with a tooth or projection $n^\times$, and in the screw L notches are cut at the desired places. Hence as the screw rotates first in one direction and then in the other, according to whether the canvas A is being wound in one direction or the other, as aforesaid, the nut N' will be moved progressively from end to end of the screw L; but whenever the projection or tooth $n^\times$ comes to a notch in the screw L such tooth drops into the notch and stops the movement of the parts.

The lever $n'$ extends over and rests upon a rocker V, (shown in Figs. 3 and 7,) such rocker being pivoted at P, and the hammer T is adapted to fall upon one end of the rocker V, as indicated in Fig. 7, so as to raise the longitudinal bar forming the other side of the rocker and upon which the lever $n'$ rests, so that when the hammer T is allowed to fall by the action of the clock mechanism the hammer T, striking the end $v$ of the rocker V, lifts the lever $n'$, raising the tooth $n^\times$ out of the notch in the screw and allowing the parts to rotate and move the canvas to bring the next sign or design into view, and then the movement is again stopped by the tooth $n^\times$ dropping into one of the notches of the screw. This movement proceeds in one direction until the canvas has been wound upon the roller B' and then the rotation of the parts is reversed, as before described, and the nut N' carried along by the screw in the other direction, and the movements are stopped periodically while the canvas is being drawn down and being wound upon the roller $B^2$.

The parts are to be so proportioned and timed that the wheels H H' will make about three-quarters of a rotation during the time that the web is being drawn off from one roller and wound upon the other, and during this time the nut-section N' will have traveled from near one end of the screw to near the other end and the reversal of directions of motion will then take place.

Any desired means may be employed for raising the lever $T^2$ and hammer T. In Figs. 1 and 3 the lever $T^2$ is represented as pivoted at $t$, and beneath the lever is a lifter X, extending down to and resting upon a horizontal arm Y, extending out from the axis $y$, as indicated by dotted lines in Fig. 2, and upon the end of this axis $y$ is a pawl Y', that is acted upon by the teeth of the ratchet-wheel H', and the parts are so timed that the inclined teeth of the ratchet-wheel H', acting upon the pawl Y', lift the rod X and the hammer shortly after it has fallen, so that it is held up out of the way by the escapement S, ready to be dropped by the clock-movement, as aforesaid.

I have represented in Figs. 3 and 7 a spring $n^2$ as fastened to the under side of the lever-arm $n'$ and passing below the pivot-rod P, the object of this spring being to bring the tooth $n^x$ quickly into the notch in the screw that may present itself, and I have represented the stationary guide-rod O as passing through the nut N' and forming a guide for the same, and I have shown the screw L as supported by pivot-screws $l'$ and $l^2$ at the ends thereof, and the notches in the screw are indicated at $l^3$.

In Fig. 1 I have represented the screw L as adapted to work for the stopping of the canvas when moving in either direction; but in Fig. 8 I have shown a second screw and stopping mechanism connected with the lower roll $B^2$ to act when the canvas is being wound upon the roll B', and in Figs. 13 and 14 I have illustrated these devices by perspective views. In these views the screws L' and $L^2$ are represented as having projecting pins $l^4$ instead of notches, and the levers $n^3$ $n^4$ are pivoted upon the respective nuts $N^5$ $N^6$, such nuts being guided by the rods O' $O^2$ as the nuts are moved along progressively by the screws, and the rockers V' $V^2$ are made as plates connected together by the rod $v^x$, such rockers V' $V^2$ being pivoted at P' and $P^2$, respectively, and the hammer T is adapted to fall upon one side of the rocker V' to give motion to the same and move the lever $n^3$ out of contact with the pin $l^4$ to allow of the rotation of the parts, and when the hammer T is raised the spring $n^5$ brings the end of the lever $n^3$ down against the stop on the screw-thread to stop the rotation of the screw when the next stud $l^4$ comes in contact with the end of such lever, and the same operation is performed in relation to the screw $L^2$ through the agency of the rod $v^x$ and rocker $V^2$, acting upon the lever $n^4$, when the canvas is being drawn up and rolled upon the roller B'.

Upon reference to the diagram Fig. 8 and the arrows thereon, it will be observed that the roller $B^2$ is being rotated to draw down the web; but the direction of rotation of the screw $L^2$ is such that its projections $l^4$ pass by the stop-lever $n^4$ and raise the end thereof, and hence the screw $L^2$ is not acted upon by the stop-lever $n^4$; but the screw L' and its stops $l'$ are in action with the lever $n^3$. Hence there will be a tension maintained on the web, because the stop is applied to the roller from which the web is being drawn off and the parts will all be stopped until liberated by the hammer. When the web is being drawn upwardly and the parts rotated in the opposite direction, the actions will be reversed and the stop-lever $n^3$ will not operate; but the lever $n^4$ will act to stop the rotation of the screw $L^2$ and all the other parts until the hammer falls.

It is to be understood that the devices before described may be acted upon under different circumstances. For instance, the escapement S might be moved by the weight of a coin instead of by clockwork, and the apparatus would stand still until some means were employed for liberating the stop of the screw, and I do not limit myself to any particular device for moving or disengaging the stop-lever of the screw.

In Figs. 9 to 12 modified devices are represented for raising the lever $T^2$ of the hammer T. In this case the motion is derived from the shaft $f$, such shaft being prolonged and having fastened upon it a ratchet-wheel $X^2$, and adjacent to the ratchet-wheel is a tumbler $X^3$, loose upon the shaft $f$ and having a weight $X^5$, which tumbler has pivoted upon it a pawl $Y^3$, adapted to engage the teeth of the ratchet-wheel $X^2$, and the pawl $Y^3$ has a projection $y^2$ and a spring $y^3$, and there is upon the tumbler $X^3$ a projecting pin $x^3$, and the stationary stop $Y^2$ acts upon the pawl $Y^3$, and upon reference to Figs. 10 and 12 it will be noticed that the end of the lever $T^2$ is projected beyond the pivot $t$. The shaft $f$ and ratchet-wheel $X^3$ rotate in the direction of the arrows, Figs. 9 and 11, and the parts are so constructed that when the lever $T^2$ has been raised into the position indicated in Figs. 11 and 12 and the hammer latched the pawl $Y^3$ is moved out of contact with the ratchet-wheel $X^2$ by the action of the stop $Y^2$ against the beveled end of the pawl, and the short end of the hammer-lever $T^2$ is adjacent to the pin $x^3$ and the projection $y^2$ upon the pawl, and as the hammer falls when unlatched by the escapement the short end of the lever $T^2$, acting upon the pin $x^3$, throws the tumbler $X^3$ back into the position shown in Figs. 9 and 10, and during this movement the end of the lever $T^2$ throws the tooth of the pawl $Y^3$ into one of the teeth of the wheel $X^2$, and such pawl immediately receives motion from the ratchet-wheel and carries the short end of the lever $T^2$ downwardly and raises the hammer so that it is held by the escapement, and at this time the beveled end of the pawl $Y^3$, taking against the stop $Y^2$, causes the pawl to be withdrawn from the teeth of the ratchet-wheel $X^2$, so that the latter is allowed to revolve freely until the hammer again falls.

It will be observed that upon the tumbler $X^3$ the weight $x^5$ serves as a counterpoise to